(12) United States Patent
Duffy et al.

(10) Patent No.: US 12,399,579 B2
(45) Date of Patent: Aug. 26, 2025

(54) WRITING INSTRUMENTS WITH INTEGRATED DATA HANDLING AND HAPTIC FEEDBACK SUBSYSTEMS

(71) Applicant: SOCIÉTÉ BIC, Clichy (FR)

(72) Inventors: David Duffy, Zürich (CH); Bernadette Elliott-Bowman, Surrey (GB)

(73) Assignee: SOCIÉTÉ BIC, Clichy (FR)

( * ) Notice: Subject to any disclaimer, the term of this patent is extended or adjusted under 35 U.S.C. 154(b) by 0 days.

(21) Appl. No.: 18/261,609

(22) PCT Filed: Dec. 6, 2021

(86) PCT No.: PCT/EP2021/084391
§ 371 (c)(1),
(2) Date: Jul. 14, 2023

(87) PCT Pub. No.: WO2022/152466
PCT Pub. Date: Jul. 21, 2022

(65) Prior Publication Data
US 2024/0069652 A1    Feb. 29, 2024

(30) Foreign Application Priority Data
Jan. 15, 2021   (EP) ..................................... 21305047

(51) Int. Cl.
*G06F 3/0354*   (2013.01)
*G06F 3/01*     (2006.01)

(52) U.S. Cl.
CPC .......... *G06F 3/03545* (2013.01); *G06F 3/016* (2013.01)

(58) Field of Classification Search
CPC .... G06F 3/016; G06F 3/03545; G06F 3/0383; G09B 11/00
See application file for complete search history.

(56) References Cited

U.S. PATENT DOCUMENTS 8,723,820 B1 * 5/2014 Han .................... G06F 3/03545
345/173
2013/0120324 A1 * 5/2013 DiVerdi ............. G06F 3/03545
715/764

(Continued)

FOREIGN PATENT DOCUMENTS

KR     20100107997 A   10/2010

OTHER PUBLICATIONS

Mohamad Eid, Mohamed Mansour, Abdulmotaleb H. El Saddik, and Rosa Iglesias. 2007. A haptic multimedia handwriting learning system. In Proceedings of the international workshop on Educational multimedia and multimedia education (Emme '07). Association for Computing Machinery, New York, NY, USA, 103-108. https://doi.org/10.1145/1290144.1290161.

(Continued)

*Primary Examiner* — Chun-Nan Lin
(74) *Attorney, Agent, or Firm* — Bookoff McAndrews, PLLC

(57) ABSTRACT

A writing instrument comprises a body, a first data handling subsystem arranged in the body and configured to transmit and/or receive data, and a haptic feedback subsystem arranged in the body and configured to receive data from the first data handling subsystem. The haptic feedback subsystem is configured to provide a haptic feedback to a user based on data received from the first data handling subsystem.

20 Claims, 5 Drawing Sheets

(56) References Cited

U.S. PATENT DOCUMENTS

| | | | |
|---|---|---|---|
| 2015/0212602 A1* | 7/2015 | Lor | G06F 3/048 |
| | | | 345/175 |
| 2015/0277596 A1* | 10/2015 | Hoffman | G06F 3/03546 |
| | | | 345/179 |
| 2017/0083096 A1 | 3/2017 | Rihn et al. | |
| 2017/0131874 A1* | 5/2017 | Redenbach | G06F 3/04815 |
| 2018/0183725 A1* | 6/2018 | Ben-Hagai | H04L 49/3009 |
| 2019/0163275 A1* | 5/2019 | Iodice | G06F 3/03545 |
| 2021/0018985 A1* | 1/2021 | Verbeke | H04N 9/3179 |
| 2021/0223864 A1* | 7/2021 | Forsland | G06F 3/016 |
| 2021/0314556 A1* | 10/2021 | Fattal | G09G 3/3406 |

OTHER PUBLICATIONS

Search Report and Written Opinion issued in international Application No. PCT/EP2021/084391, mailed on Mar. 18, 2022.

Thomas Langerak, Juan José Zárate, Velko Vechev, David Lindlbauer, Daniele Panozzo, and Otmar Hilliges. 2020. Optimal Control for Electromagnetic Haptic Guidance Systems. In Proceedings of the 33rd Annual ACM Symposium on User Interface Software and Technology (UIST '20). Association for Computing Machinery, New York, NY, USA, 951-965. https://doi.org/10.1145/3379337.3415593.

* cited by examiner

WRITING INSTRUMENTS WITH INTEGRATED DATA HANDLING AND HAPTIC FEEDBACK SUBSYSTEMS

CROSS REFERENCE TO RELATED APPLICATIONS

This is a National Stage application under 35 U.S.C. § 371 of International Application No. PCT/EP 2021/084391, filed Dec. 6, 2021, now published as WO 2022/152466 A1, which claims priority to European Patent Application No. 21305047.9, filed on Jan. 15, 2021, the entireties of which are hereby incorporated by reference.

TECHNICAL FIELD

The present disclosure relates to the field of writing instruments, more specifically to a writing instrument configured to provide a haptic feedback to a user during an artwork operation, a writing instrument system comprising such a writing instrument, and a computer-implemented method using the writing instrument system.

BACKGROUND

Writing instruments are available in various designs. On the one hand, there are writing instruments that are suitable for analogue artwork operations, e.g., the use of a pen or brush for an artwork operation such as drawing, writing, and/or painting on an artwork medium including, e.g., some piece of paper, a canvas and/or skin of a user. On the other hand, there are writing instruments that are suitable for digital artwork operations, e.g., the use of a smart pen or smart brush for an artwork operation like drawing, writing, and/or painting on a digital artwork medium including, e.g., a digital sheet.

In recent developments of writing instruments, attempts have been made to assist a user performing a selected artwork operation on a particular artwork medium by providing guidance, e.g., by providing a digital template or a tracing guide displayed on an artwork medium for both analogue and/or digital artwork operations. However, such guidance including digital templates and/or tracing guides requires advanced technology, e.g., augmented reality or projection. Furthermore, current low-tech methods of providing guidance for an artwork operation do not support the use of various artwork media, e.g., writing, drawing, and/or painting on a user's skin.

Thus, the object of the present disclosure is to provide a writing instrument and/or a writing instrument system that are dynamically adaptable for different artwork operations and artwork media. Another object of the present disclosure is to provide a writing instrument and/or a writing instrument system configured to provide guidance for a user during an artwork operation to create an artwork in a simple way.

SUMMARY

The present disclosure relates to a writing instrument according to claim 1, a writing instrument system for providing haptic feedback to a user according to claim 4, and a computer-implemented method for providing haptic feedback to a user during an artwork operation using the writing instrument system according to claim 9. The dependent claims depict advantageous embodiments of the present disclosure.

According to a first aspect of the present disclosure, a writing instrument is provided that comprises a body, a first data handling subsystem arranged in the body and configured to transmit and/or receive data, and a haptic feedback subsystem arranged in the body and configured to receive data from the first data handling subsystem. The haptic feedback subsystem is configured to provide a haptic feedback to a user based on data received from the first data handling subsystem. The writing instrument according to the present disclosure can provide an intuitive and dynamic way for users to receive guidance at performing an artwork due to the haptic feedback subsystem providing a haptic feedback to a user, that is easily customized for a desired artwork (e.g., a drawing or image) and artwork medium (e.g., paper, digital writing device, or skin). The writing instrument can be used to perform an artwork operation on various artwork media. During an artwork operation, the writing instrument can capture a user's input (e.g., direction, speed, or pressure) and can output a desired haptic feedback.

The writing instrument may comprise a longitudinal axis and a radial direction perpendicular to the longitudinal axis.

In an embodiment, the haptic feedback subsystem may be an ultrasound actuator. The haptic feedback subsystem may be configured to emit ultrasound waves in the radial direction, more specifically wherein the ultrasound waves may be targeted to a focus point.

The haptic feedback subsystem may comprise at least two ultrasound actuator arrays. The at least two ultrasound actuator arrays may be separated by an angle measured in a circumferential direction of the body with respect to the longitudinal axis, more specifically wherein each of the at least two ultrasound actuator arrays may be oriented towards the radial direction. In embodiments, the angle may be about 60° to 180°, more specifically about 90° to 150°.

In embodiments, each of the at least two ultrasound actuator arrays may comprise a plurality of ultrasound wave emitting components. Each of the ultrasound wave emitting components may be configured to emit ultrasound waves. These waves may be targeted to the focus point, wherein the targeting may be improved by the arrangement of the respective ultrasound wave emitting components to each other.

In embodiments, the plurality of ultrasound wave emitting components may be arranged in a linear configuration, more specifically wherein the plurality of ultrasound wave emitting components may be arranged adjacent and aligned to each other in the direction of the longitudinal axis.

In the radial direction, the plurality of ultrasound wave emitting components may be arranged on a circular path facing away from the longitudinal axis. This configuration may lead, when emitting ultrasound waves, to the waves becoming more targeted, thus ending at the focus point at a user's hand/finger(s)/digit tips.

The writing instrument may further comprise a nib connected to a first end of the body. The body may comprise a grip which may be arranged proximate the nib. In embodiments, the haptic feedback subsystem may be arranged in the grip.

In embodiments, the haptic feedback subsystem may be arranged proximate the first end and/or wherein the first data handling subsystem may be arranged proximate a second end of the body.

According to a second aspect of the present disclosure, a writing instrument system is provided for providing a haptic feedback to a user. The writing instrument system comprises a writing instrument as described for the first aspect of the present disclosure. Furthermore, the writing instrument system comprises a second data handling subsystem configured to receive and/or transmit data to the first data handling subsystem. Furthermore, the writing instrument system comprises a user interface subsystem configured to generate input data based on a user's input and configured to transmit the input data to the second data handling subsystem. The writing instrument system according to the present disclosure can enable dynamically adaptable artwork templates for users of analogue artwork techniques (e.g., drawing, writing, and/or painting) in a discrete package that can be used together with any artwork medium. The writing instrument system can enable a realistic guidance experience through providing haptic feedback to the user, wherein the user can feel the sensation of "drawing on rails" when holding the writing instrument. Furthermore, templates to produce any artwork (e.g., an image) on any artwork medium (e.g., sheet of paper) may be selected and generated, which can lead to a wide range of user customization possibilities. More specifically, a user can share or select a desired artwork to be done (e.g., an image or drawing) via the user interface subsystem based on which the system can generate a route for the writing instrument by which the user may be guided to create the selected artwork. The system can generate an artwork template and provide "virtual barriers", such that a user experiences a haptic feedback in a corresponding part of the hand/finger(s)/digit tips when reaching the "virtual barrier". Thus, a user may experience the sensation that the writing instrument follows a route along the selected artwork. Guidance at performing an artwork operation may allow a user to receive help being provided discretely. Consequently, the writing instrument system can provide an intuitive and dynamic way for users to receive artwork performing guidance that is easily customized for a desired artwork and any artwork medium.

The writing instrument system may further comprise a sensor subsystem, wherein the sensor subsystem may be configured to generate and transmit data to the first data handling subsystem and/or to the second data handling subsystem. More specifically, the sensor subsystem may be configured to generate and transmit motion tracking data of the writing instrument. The sensor subsystem may be arranged in the body and/or integrated in an external device. In embodiments, the external device may be a part of the user interface subsystem.

The sensor subsystem may comprise one or more sensors configured to generate motion tracking data of the writing instrument. In embodiments, the one or more sensors may include an accelerometer. Additionally or alternatively, the one or more sensors may include at least one rotational sensor and/or at least one optical sensor.

In embodiments, the second data handling subsystem may be a part of the user interface subsystem.

The first data handling subsystem and/or the second data handling subsystem and/or the user interface subsystem may comprise a data processing unit configured to process data. The data processing unit may be configured to process the input data generated by the user interface subsystem.

The user interface subsystem may comprise a displaying unit that is configured to provide a visual feedback to a user based on visual data, more specifically wherein the visual data may be generated by the processed input data.

In embodiments, the processing unit may be configured to run a route generation algorithm, which is configured to generate route definition data based on the user input data. The route definition data may comprise one or more of an initial vector map, at least one vector path comprising a plurality of vector points, a predefined movement tolerance range, and a starting point.

In embodiments, the data processing unit may be configured to run a location algorithm, which may be configured to generate location data based on the motion tracking data of the writing instrument.

In embodiments, the data processing unit may be configured to run a haptic feedback scheme algorithm, which is configured to generate haptic feedback instruction data, more specifically wherein the haptic feedback subsystem may be triggered to provide a haptic feedback based on the haptic feedback instruction data.

The haptic feedback subsystem may be configured to emit ultrasound waves based on the haptic feedback instruction data. The haptic feedback instruction data may be generated based on the location data and the route definition data. In embodiments, the haptic feedback instruction data can comprise a timestamp indicating a timing and/or duration of a haptic feedback. In embodiments, the haptic feedback instruction data may comprise trigger data indicating one or more components of the haptic feedback subsystem to provide a haptic feedback. In embodiments, the haptic feedback instruction data may comprise intensity data indicating the intensity of the haptic feedback.

The writing instrument may further comprise a first power source, wherein the first power source may be configured to supply power to the first data handling subsystem, the sensor subsystem, and/or the haptic feedback subsystem. In embodiments, the first power source may be arranged in the body.

According to a third aspect of the present disclosure, a computer-implemented method for providing haptic feedback to a user during an artwork operation using a writing instrument system as described for the second aspect of the present disclosure is provided. The method comprises the steps of initializing the writing instrument system to perform an artwork operation, capturing route definition data from the user interface subsystem, capturing location data from the sensor subsystem, processing and/or comparing the captured location data and/or route definition data, and triggering the haptic feedback subsystem to provide a haptic feedback to a user based on the processed and/or compared captured location data and/or route definition data. The haptic feedback can thus provide the sensation of "hitting a rail" to the user, helping the user to accurately perform an artwork operation. The haptic feedback can thus induce a momentary correction of the user's pen trajectory and/or induce a sensory guidance system to "stay" on an artwork operation path.

In embodiments, initializing the writing instrument system to perform an artwork operation may comprise capturing input data via the user interface subsystem. More specifically, capturing input data may comprise applying an input algorithm. The input algorithm may be configured to prompt at least one user interaction via the user interface subsystem guiding a user to identify an artwork to be created and to select an artwork medium, and to receive an identified artwork and a selected artwork medium via the user interaction, more specifically wherein the input algorithm may be configured to generate input data based on the user interaction. In embodiments, the artwork medium may be a sheet of paper or a digital sheet.

Capturing route definition data from the user interface subsystem may comprise applying a route generation algorithm. The route generation algorithm may be configured to process the input data to a vector graphics. In embodiments, the route generation algorithm may be configured to generate an initial vector map based on the vector graphics. Furthermore, the route generation algorithm may be configured to generate at least one vector path based on the initial vector map, more specifically wherein the at least one vector path may comprise a plurality of vector points. The route generation algorithm may be configured to generate a starting point by defining one of the plurality of vector points as a starting point. Furthermore, the route generation algorithm may be configured to define a predefined movement tolerance range comprising a tolerance threshold and to associate the at least one vector path, more specifically each of the plurality of vector points, with the predefined movement tolerance range. The route definition data may comprise one or more of the initial vector maps, the vector path comprising a plurality of vector points, the predefined movement tolerance range, and the starting point.

Subsequent to capturing route definition data from the user interface subsystem, the method may further comprise prompting an artwork operation and/or visualizing captured route definition data to a user via the user interface subsystem. Prompting an artwork operation and visualizing captured route definition data may comprise applying the route generation algorithm to prompt at least one user interaction via the user interface subsystem guiding a user to start an artwork operation on a selected artwork medium using the writing instrument. Prompting an artwork operation and visualizing captured route definition data may further comprise applying the route generation algorithm to prompt a visualization of route definition data, more specifically the starting point, to a user via the user interface subsystem.

Capturing location data from the sensor subsystem may comprise capturing motion tracking data via the sensor subsystem during an artwork operation of the writing instrument. The motion tracking data may comprise one or more of a position of the writing instrument, a direction of motion of the writing instrument, a speed of motion of the writing instrument, an acceleration of motion of the writing instrument, a force acting on the writing instrument, a mode of handling the writing instrument, a mode of use of the writing instrument and visual data of the artwork medium. In embodiments, capturing motion tracking data may comprise continuously monitoring the motion tracking data via the sensor subsystem. In embodiments, the motion tracking data may comprise a timestamp.

Capturing location data from the sensor subsystem may comprise defining a location of the writing instrument during an artwork operation with respect to an artwork medium by applying a location algorithm. The location algorithm may be configured to generate location data by processing the motion tracking data and correlating the motion tracking data with the artwork medium. In embodiments, capturing location data can comprise applying the location algorithm to generate, more specifically to continuously generate, a virtual coordinate grid of the artwork medium based on the motion tracking data and to associate the virtual coordinate grid with the artwork medium. Capturing location data may further comprise applying the location algorithm to correlate, more specifically to continuously correlate, tracking motion data of the writing instrument with the coordinate grid associated with the artwork medium to define a position and/or orientation of the writing instrument with respect to the artwork medium.

Processing and/or comparing the captured route definition data and/or location data may comprise applying a haptic feedback scheme algorithm to process and/or compare, more specifically to continuously compare, the route definition data and the location data. In embodiments, the haptic feedback scheme algorithm may be configured to generate writing instrument tracking data comprising a timestamp based on the compared route definition data and location data.

The haptic feedback scheme algorithm may be configured to determine, based on the processed and/or compared route definition data and location data, whether the writing instrument is operated within the predefined movement tolerance range. Furthermore, the haptic feedback scheme algorithm may be configured to determine whether the writing instrument reaches and/or exceeds the tolerance threshold of the predefined movement tolerance range.

The haptic feedback scheme algorithm may be configured to generate haptic feedback instruction data when determining that the writing instrument reaches and/or exceeds the tolerance threshold of the predefined movement tolerance range.

In embodiments, the haptic feedback scheme algorithm may be configured to generate haptic feedback instruction data based on a prediction indicative that the writing instrument will reach the tolerance threshold. The prediction may be based on at least one basic proximity threshold defined for one or more data values of the location data and/or the route definition data.

The haptic feedback scheme algorithm may be configured to generate one or more of intensity data indicating the intensity of a haptic feedback, duration data indicating the duration of a haptic feedback, and/or timing data indicating a timing of a haptic feedback. The intensity data, the duration data and/or the timing data may be determined by determining the position of the writing instrument in the predefined movement tolerance range, more specifically by the distance of the writing instrument to the tolerance threshold.

In embodiments, the haptic feedback scheme algorithm may be configured to increase values of intensity data and/or duration data of a haptic feedback when the writing instrument is moved towards the tolerance threshold.

The haptic feedback instruction data may comprise one or more of intensity data, duration data and timing data of a haptic feedback.

Triggering the haptic feedback subsystem may comprise applying the haptic feedback scheme algorithm to trigger the haptic feedback subsystem based on the haptic feedback instruction data.

In embodiments, the haptic feedback scheme algorithm may be configured to determine whether the writing instrument is in physical contact with the artwork medium, and, when determining that the writing instrument is physically distanced to the artwork medium, to suppress triggering haptic feedback based on the haptic feedback instruction data. Determining whether the writing instrument is in physical contact with the artwork medium may comprise applying the haptic feedback scheme algorithm to process location data including proximity or contact sensor data of the writing instrument with respect to the artwork medium, or capacitive sensor data, captured from the sensor subsystem.

When triggering the haptic feedback subsystem to provide haptic feedback to the user, the haptic feedback scheme algorithm may be applied to determine, based on the processed and/or compared location data and route definition data, if the writing instrument continues exceeding or reaching the tolerance threshold, or, if the writing instrument returns to operate or operates within the predefined movement tolerance range.

When determining that the writing instrument returns to operate or operates within the predefined tolerance range, the feedback scheme algorithm may be applied to cease triggering the haptic feedback subsystem to provide haptic feedback based on the haptic feedback instruction data.

The haptic feedback scheme algorithm may be configured to prompt at least one user interaction via the user interface subsystem guiding a user to identify an intensity of a haptic feedback based on selecting an intensity strength value from an intensity range provided by the intensity data, and to receive an identified intensity and selected intensity strength value.

BRIEF DESCRIPTION OF THE DRAWINGS

Other characteristics will be apparent from the accompanying drawings, which form a part of this disclosure. The drawings are intended to further explain the present disclosure and to enable a person skilled in the art to practice it. However, the drawings are intended as non-limiting examples. Common reference numerals on different figures indicate like or similar features.

DETAILED DESCRIPTION

Embodiments of the writing instrument, the writing instrument system, and the computer-implemented method according to the present disclosure will be described in reference to the drawings as follows.

Figure 1:
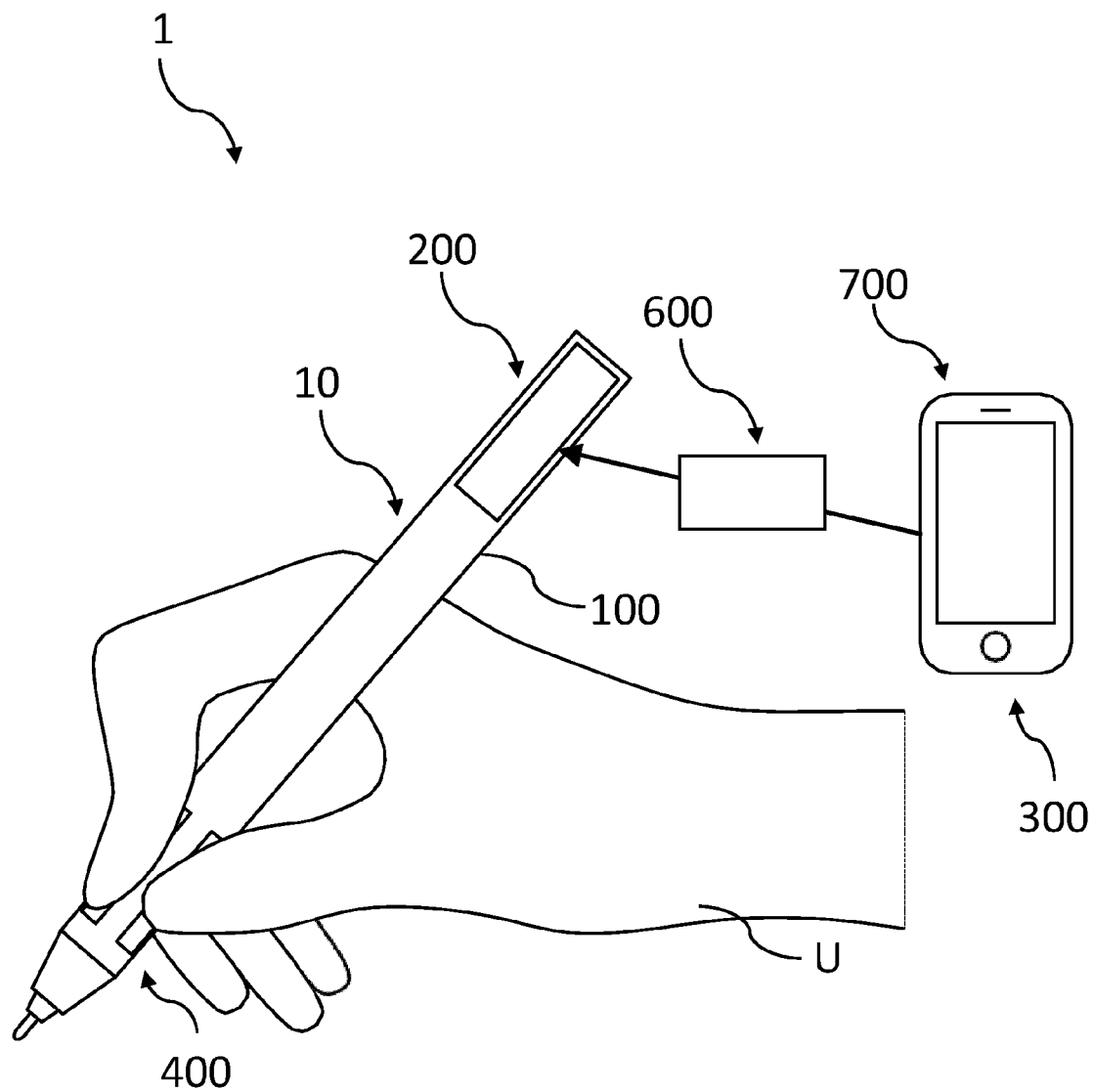
FIG. 1 is a schematic view of the writing instrument system according to the second aspect of the present disclosure.

FIG. 1 is a schematic view of the writing instrument system 1 for providing a haptic feedback to a user U according to the present disclosure. The writing instrument system 1 comprises a writing instrument 10. The writing instrument 10 comprises a body 100, a first data handling subsystem 200 arranged in the body 100 and configured to transmit and/or receive data, and a haptic feedback subsystem 400 arranged in the body 100 and configured to receive data from the first data handling subsystem 200. The haptic feedback subsystem 400 is configured to provide a haptic feedback to a user U based on data received from the first data handling subsystem 200. Embodiments of the writing instrument 10 will be described in more detail with reference to FIGS. 2A to 2C below. As shown in FIG. 1, the writing instrument system 1 further comprises a second data handling subsystem 600 configured to receive and/or transmit data to the first data handling subsystem 200, and a user interface subsystem 700 configured to generate input data based on a user's input and configured to transmit the input data to the second data handling subsystem 600. In an embodiment, the second data handling subsystem 600 can be a part of the user interface subsystem 700.

The writing instrument system 1 according to the present disclosure can enable dynamically adaptable artwork templates for users of analogue artwork techniques (e.g., drawing, writing, or painting) in a discrete package that can be used on any artwork medium (e.g., a paper sheet, a digital sheet, and/or a user's skin). The writing instrument system 1 can enable a realistic guidance experience through providing haptic feedback to the user U, wherein the user U can feel the sensation of "drawing on rails". Furthermore, templates to create any artwork on any artwork may be selected and generated which can lead to a wide range of user customization possibilities. More specifically, a user U can share or select a desired artwork to be created (e.g., an image, a drawing, or a painting) via the user interface subsystem 700 based on which the system 1 can generate a "path" for the writing instrument 10 on which the user may be guided to perform/create the selected artwork. The system 1 may generate an artwork template and provide "virtual barriers", such that a user U can experience a haptic feedback in a corresponding part of the hand/finger(s)/digit tips when reaching the "virtual barrier". Thus, a user U may experience the sensation that the writing instrument 10 follows a "path" along the selected artwork medium for an artwork to be created. More simply, a user U can be guided on an artwork medium in order to create a selected artwork. Furthermore, artwork performing guidance may allow a user to receive help being provided discretely. Consequently, the writing instrument system 1 can provide an intuitive and dynamic way for users to receive artwork performing guidance that is easily customized for a desired artwork to be created on any artwork medium.

During an artwork operation, a user U can hold the writing instrument 10 and can receive artwork performing guidance in an intuitive and dynamic way since the haptic feedback subsystem 400 is configured to provide haptic feedback to the user. The writing instrument 10 can be used to perform an artwork operation on various artwork media. During an artwork operation, the writing instrument 10 can capture a user's input (e.g., direction, speed, or pressure) during movement of the writing instrument 10 and can output a desired haptic feedback, which will be described in more detail below. The data that the haptic feedback subsystem 400 receives from the first data handling subsystem 200, can be haptic feedback instruction data on the basis of which the haptic feedback subsystem 400 provides haptic feedback to a user U. In embodiments, the writing instrument 10 can be a smart pen or a smart brush.

Figure 2A:
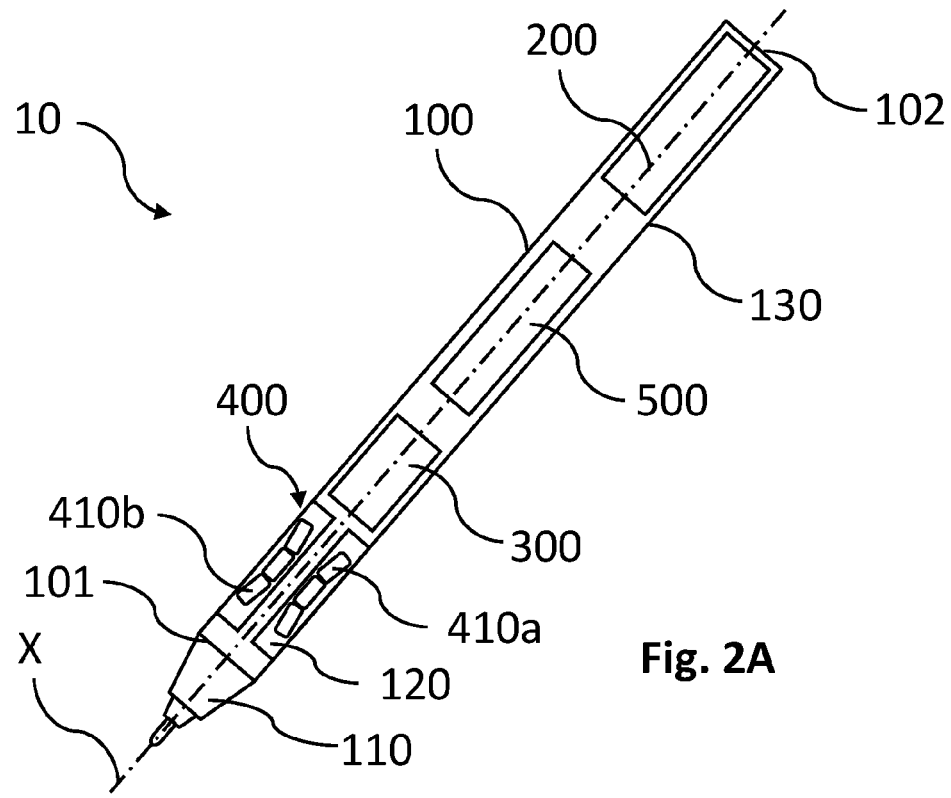
FIGS. 2A to 2C are detailed schematic views of the writing instrument according to the first aspect of the present disclosure.
Figure 2B:
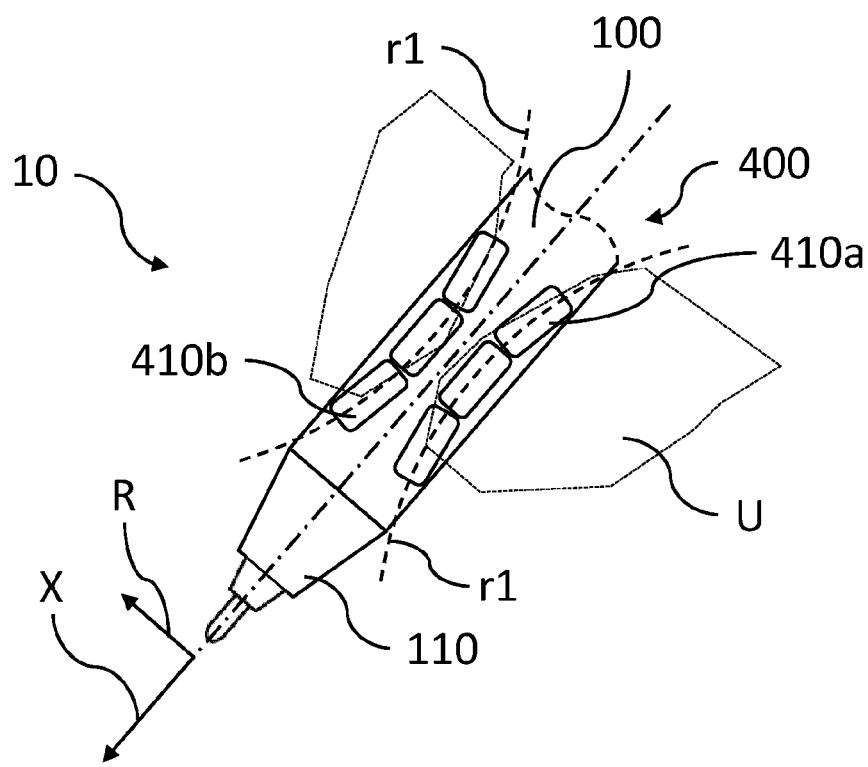
Figure 2C:
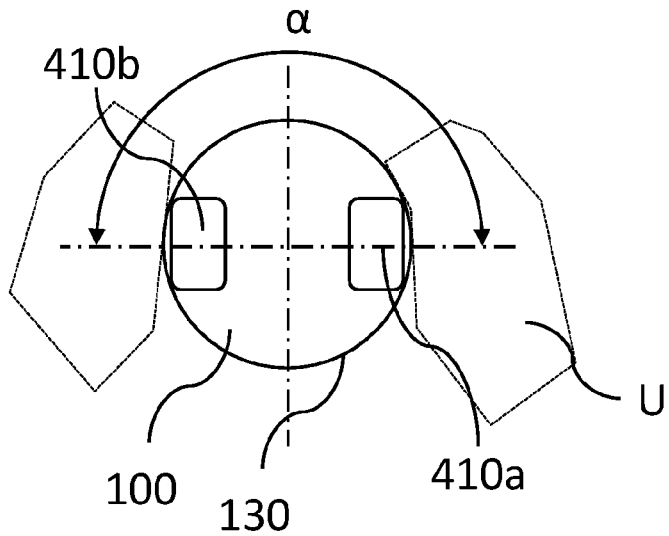

Referring to FIGS. 2A to 2C, the writing instrument 10 is shown in more detail. The writing instrument 10 comprises a longitudinal axis X and a radial direction R perpendicular to the longitudinal axis X. The longitudinal axis X extends in the longitudinal direction of the body 100. The body 100 can be cylindrical, more specifically wherein the body 100 comprises a circular cross-section. However, in embodiments, the body 100 may have a triangular, quadrangular, rectangular, or polygonal cross-section. The body 100 may comprise a nib 110 connected to a first end 101 of the body 100, which can be connected to the body 100 by positively locking, non-positively locking, and/or adhesive bond. In embodiments, the nib 110 can be releasably connected to the body 100, or, integrally formed with the body 100. The body 100 comprises a second end 102 on an opposite side of the body 100 with respect to the first end 101. Furthermore, the body 100 can comprise a grip 120 arranged proximate the nib 110 (and/or the first end 101). The grip 120 may lead to easier handling of the writing instrument 10 for a user U during an artwork operation. In embodiments, the grip 120 can be arranged on an outer circumferential surface 130 of the body 100 and can extend into the body 100. In embodiments, the body 100 can be a tubular body and the writing instrument 10 can comprise a fluid reservoir for storing a fluid composition, e.g., ink. The nib 110 may be in fluid communication with the fluid reservoir. In some embodiments, the fluid communication may be established by a channel connecting the reservoir and the nib 110 or by the nib 110 comprising a wick-like or porous element which extends into the reservoir and is configured to transport fluid (more specifically ink) from the reservoir to the nib 110. In embodiments, the writing instrument 10, more specifically the nib 110, can further comprise a valve element (not shown) configured to switch between a fluid flow preventing condition and a fluid flow enabling condition. The valve element may be configured to control flow of the fluid composition from the reservoir to or towards an artwork medium. However, in case the writing instrument 10 is provided as a smart device, e.g., a smart pen, the fluid reservoir and/or the fluid composition and/or the valve element may be omitted.

Figure 3:
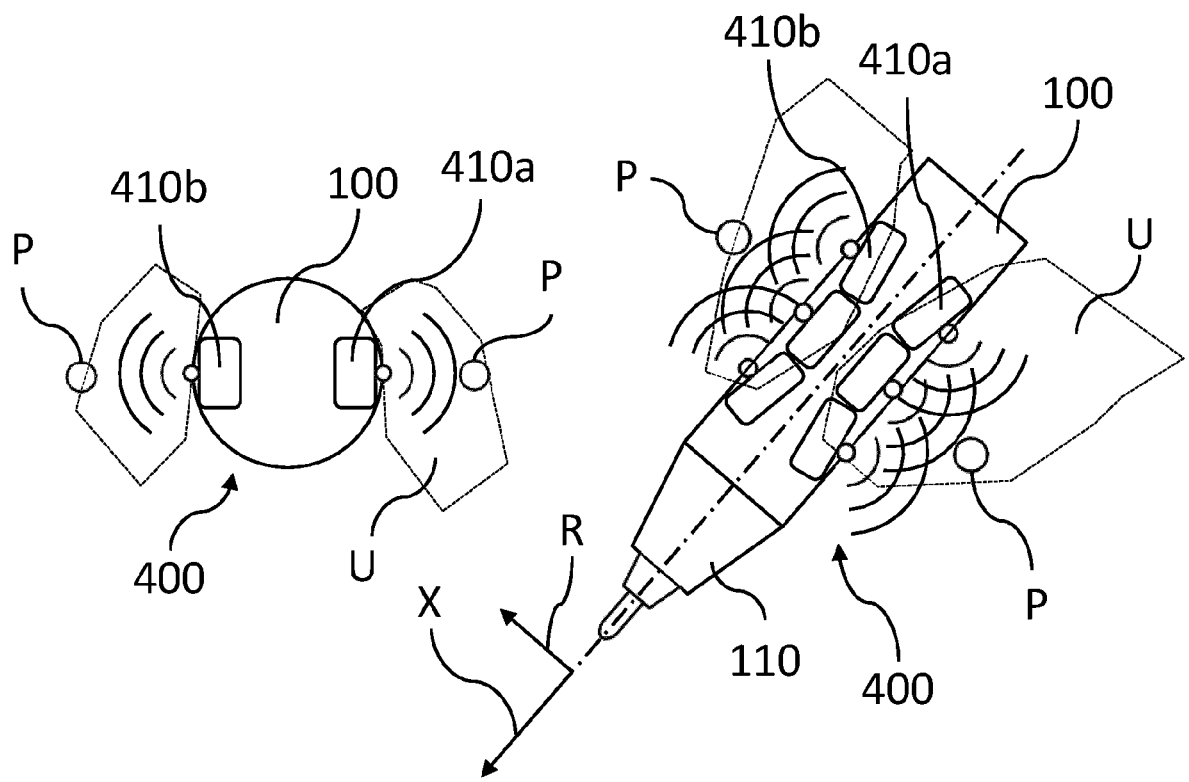
FIG. 3 is a schematic view of the writing instrument providing haptic feedback to a user.

In embodiments, the haptic feedback subsystem 400 can be an ultrasound actuator. The haptic feedback subsystem 400 can be configured to emit ultrasound waves in the radial direction R, more specifically wherein the ultrasound waves are targeted to a focus point P, as shown in FIG. 3. In other words, the haptic feedback subsystem 400 may use time reversal signal processing to focus a haptic feedback (emitted waves) to a point in space. During an artwork operation, a user can hold the writing instrument 10 with his/her hand/finger(s)/digit tips. The haptic feedback subsystem 400 can be configured to emit ultrasound waves in the radial direction R that can be targeted to focus point P on or proximate the other side of the respective hand/finger(s)/digit tips facing away from the writing instrument 10. Thus, the user U may experience a haptic feedback (or experience a sensation) on the hand/finger(s)/digit tips. In other words, the ultrasound waves can be focused as they travel through the user's hand/finger(s)/digit tips to end at point P to create the sensation of a touch when emitted.

As shown in FIGS. 2A to 3, the haptic feedback subsystem 400 comprises at least two ultrasound actuator arrays 410a, 410b. The at least two ultrasound actuator arrays 410a, 410b are adapted to provide digitized artwork information in form of haptic feedback to a user U, more specifically by emitting ultrasound waves. In embodiments, the haptic feedback subsystem 400 can comprise two, three, four or more ultrasound actuator arrays which can be oriented in different directions with respect to the radial direction R. As shown in FIG. 2C, the at least two ultrasound actuator arrays 410a, 410b are separated by an angle α measured in a circumferential direction of the body 100 with respect to the longitudinal axis X, more specifically wherein each of the at least two ultrasound actuator arrays 410a, 410b is oriented towards the radial direction R. The angle α can be of about 60° to 180°, more specifically of about 90° to 150°. When a user holds the writing instrument 10, the at least two ultrasound actuator arrays 410a, 410b can be arranged in the body 100 in such a way that they are arranged in the proximity of at least two fingers/digit tips/positions on the hand of the user U. In an embodiment, the angle α can be about 120°. Also, if three ultrasound actuator arrays are provided, the ultrasound actuator arrays may be separated to each other by an angle α of about 120°, respectively.

As shown in FIGS. 2A, 2B and 3 on the right, each of the at least two ultrasound actuator arrays 410a, 410b comprises a plurality of ultrasound wave emitting components. In the embodiments shown, each of the at least two ultrasound actuator arrays 410a, 410b comprises three ultrasound wave emitting components. Each of the ultrasound wave emitting components is configured to emit ultrasound waves. These waves can be targeted to focus point P, wherein the targeting can be improved by a specific arrangement of the respective ultrasound wave emitting components to each other. Referring to FIG. 3, the ultrasound wave emitting components are arranged in the body 100 such that, when a user holds the writing instrument 10, the focus point P can be on or proximate a side of the respective hand/finger(s)/digit tips facing away from the writing instrument 10. The plurality of ultrasound wave emitting components are arranged in a linear configuration, more specifically wherein the plurality of ultrasound wave emitting components are arranged adjacent and/or aligned to each other in the direction of the longitudinal axis X. In the embodiments shown, each of the ultrasound actuator arrays 410a, 410b may comprise three ultrasound wave emitting components that are arranged adjacent and aligned to each other. In other embodiments, the plurality of ultrasound wave emitting components can be arranged in a square-like or rectangular configuration being oriented in the radial direction R, wherein the plurality of ultrasound wave emitting components can be arranged adjacent and aligned to each other in the direction of the longitudinal axis X and/or in the circumferential direction. In these embodiments, the plurality of ultrasound wave emitting components can be arranged in the body substantially parallel to the outer circumferential surface 130, viewed in a cross-section a shown, e.g., in FIGS. 2A, 2C and 3. In embodiments, at least one of the at least two ultrasound actuator arrays 410a, 410b may comprise the plurality of ultrasound wave emitting components arranged in a linear configuration and/or at least one of the at least two ultrasound actuator arrays 410a, 410b may comprise the plurality of ultrasound wave emitting components arranged in a square-like or rectangular configuration. In other embodiments, each of the at least two ultrasound actuator arrays 410a, 410b may comprise the plurality of wave emitting components arranged in a linear or square-like or rectangular configuration.

As shown in FIGS. 2A, 2B and 3 on the right, in the radial direction R, the plurality of ultrasound wave emitting components are arranged on a circular path r1 facing away from the longitudinal axis X. In other words, in the radial direction R, the plurality of ultrasound wave emitting components are arranged in a concave configuration with respect to the longitudinal axis X. In case of three ultrasound wave emitting components arranged in the linear configuration, the intermediate component may be arranged substantially parallel to the longitudinal axis X and the components arranged adjacent the intermediate component may be angled with respect to the longitudinal axis X, facing towards each other. With this configuration, when emitting ultrasound waves, the waves may become more targeted, ending at focus point P at a user's hand/finger(s)/digit tips. In case the plurality of ultrasound emitting components are arranged in a square-like or rectangular configuration, at least two ultrasound wave emitting components can be arranged adjacent to each other in the circumferential direction. In this case, the at least two ultrasound wave emitting components can also be arranged on a circular path in the circumferential direction, facing towards each other. In other words, the at least two wave emitting components can be angled to each other with respect to the longitudinal axis. Thereby, an improved targeting of the ultrasound waves to focus point P may not only achieved by the arrangement of the plurality of ultrasound wave emitting components in the radial direction R and/or axial direction X, but also by the arrangement of the plurality of ultrasound wave emitting components in the circumferential direction.

As schematically shown in FIG. 2A, the haptic feedback subsystem 400 may be arranged in the grip 120. Thus, the haptic feedback subsystem 400 is arranged proximate the first end 101 and/or the nib 110. The grip 120 can be arranged on the body 100 from a position proximate the first end 101 at least partially over a length of the body 100 along the circumferential axis X towards the second end 102. In embodiments, the grip 120 can be arranged over the whole circumference of the body 100. In other embodiments, the grip can comprise a plurality of grip elements extending at least partially over the circumference of the body 100, respectively. During an artwork operation, the user can hold the writing instrument 10 at the grip 120. Since the haptic feedback subsystem 400 is arranged in the grip 120, a good contact point with a user's hand/finger(s)/thumb/digit tips can be ensured. In an embodiment as described above, the haptic feedback subsystem 400 can comprise the at least two ultrasound actuator arrays 410*a*, 410*b* separated to each other at angle α in the circumferential direction of the body 100. In this case, the grip 120 may comprise at least two grip elements, separated to each other on the outer circumferential surface by angle α. The at least two ultrasound actuator arrays 410*a*, 410*b* can be arranged in the at least two grip elements, respectively. In another embodiment, the haptic feedback subsystem 400 can comprise three ultrasound actuator arrays separated to each other by angle α, more specifically wherein a is about 120°, in the circumferential direction. In this case, the grip 120 may comprise three grip elements, separated to each other on the outer circumferential surface by angle α of about 120°. In each case, an ultrasound actuator array can be arranged in a grip element.

As shown in FIG. 2A, the first data handling subsystem 200 may be arranged proximate a second end 102 of the body 100. However, in embodiments, the first data handling subsystem 200 can be arranged proximate the first end 101 and/or proximate the nib 110, and/or between nib 110 and haptic feedback subsystem 400, and/or between haptic feedback subsystem 400 and second end 102.

The writing instrument system 1 may further comprise a sensor subsystem 300 as shown in FIG. 1, which can be configured to generate and transmit data to the first data handling subsystem 200 and/or to the second data handling subsystem 600. More specifically, the sensor subsystem 300 can be configured to generate and transmit motion tracking data of the writing instrument 10. The motion tracking data of the writing instrument 10 can be generated during a user's artwork operation. In other words, the motion tracking data can refer, e.g., to a specific position, orientation, and/or movement of the writing instrument 10 in an artwork operation with respect to an artwork medium. As shown in FIG. 2A, the sensor subsystem 300 is arranged in the body 100. In embodiments, the sensor subsystem 300 may be arranged in the body 100 between first end 101 and second end 102 and/or in the nib 110. More specifically, the sensor subsystem 300 may be arranged in the direction of the longitudinal axis X between nib 110 and the haptic feedback subsystem 400 and/or between the haptic feedback subsystem 400 and the first data handling subsystem 200 and/or between the first data handling subsystem 200 and second end 102.

In embodiments, the writing instrument 10 may be used together with an external device. Additionally or alternatively to the sensor subsystem 300 arranged in the body 100, the sensor subsystem 300 can be integrated in the external device. Thus, in embodiments, more than one sensor subsystem 300 can be provided. The external device can be a digital device including a surface with capacity sensing sensors (e.g., touch screen). During an artwork operation, the writing instrument 10 may be operated on the capacity sensitive surface, wherein the digital artwork device may generate motion tracking data when the writing instrument is in contact with the capacity sensitive surface. The external device can be configured to transmit and/or receive data to the first data handling subsystem 200 and/or to the second data handling subsystem 600. In other embodiments, the external device can be an image capturing device, e.g., a digital camera and/or a smartphone. In an embodiment, the external device can be a part of the user interface subsystem 700. In embodiments, one or more external devices can be provided.

The sensor subsystem 300 can comprise one or more sensors configured to generate motion tracking data of the writing instrument 10. In embodiments, the one or more sensors can include an accelerometer. The accelerometer may generate acceleration data of the writing instrument 10 that can be used for positional dead reckoning, which is a process of calculating a current position of the writing instrument 10 by using a previously determined position, estimations of speed, heading direction and course over elapsed time. Additionally or alternatively, the one or more sensors can include at least one rotational sensor. The rotational sensor can be a gyroscope configured to measure orientation and/or angular velocity of the writing instrument 10 with respect to the artwork medium. In embodiments, the one or more sensors can include at least one optical sensor. The at least one optical sensor can be combined with computer vision for the motion tracking of the writing instrument by processing optical data. In embodiments, the at least one optical sensor can be arranged proximate the nib of the writing instrument (e.g., a camera). However, the at least one optical sensor can also be provided in the external device (e.g., a smart phone). In embodiments, the one or more sensors can include a magnetometer and/or a force sensor.

The first data handling subsystem 200 and/or the second data handling subsystem 600 and/or the user interface subsystem 700 can comprise a data processing unit configured to process data. The data processing unit can be configured to process the input data generated by the user interface subsystem 700. The user interface subsystem 700 can comprise a displaying unit that is configured to provide a visual feedback to a user based on visual data, more specifically wherein the visual data is generated by the processed input data. Furthermore, the user interface subsystem 700 may comprise a capacity sensitive surface (e.g., touch screen) via which the user U may select the artwork medium and or an artwork to be created. As stated above, the external device may be part of the user interface subsystem 700. In embodiments, the visual feedback may comprise one or more of an image, an animated image, a video, and an output text. A user input for the user interface subsystem 700 may be the selection of a desired artwork to be performed (e.g., an image) which can serve as an artwork template. The user interface subsystem 700 can generate input data based on the user's input. The processing unit can be configured to process the input data. Thereby, the processing unit can generate visual data comprising (additional) visual information based on the selected artwork template. In order to output the visual data to the user, the displaying unit may be used. The visual data can include a starting point for performing an artwork based on the selected artwork (template) and/or a simplified (abstracted) version of the selected artwork as a reference for the user. Besides the haptic feedback, this may further simplify creating the selected artwork template for the user.

Furthermore, the data processing unit can be configured to run a route generation algorithm, which is configured to generate route definition data based on the user input data. The route definition data can comprise one or more of an initial vector map, at least one vector path comprising a plurality of vector points, a predefined movement tolerance range, and a starting point. As stated above, the user input data can be generated based on a user input which can refer to the selection of a desired artwork (e.g., an image) to be created. The input data can be processed to a vector file (e.g., svg format) or various other file types/formats (e.g., bmg, jpeg format). The route generation algorithm can provide a (pre-) processing of the input data in order to generate the initial vector map and at least one vector path comprising a plurality of vector points. The vector path defines a (theoretical) track for the writing instrument 10 to be moved on. The vector path and/or each vector point of the vector path may be associated with a predefined movement tolerance range that can comprise a tolerance threshold defining outer limits of the predefined movement tolerance range with respect to the vector path and/or vector points. In other words, the tolerance threshold may indicate the maximum distance the writing instrument 10 may be moved away from the vector path. The predefined movement tolerance range can be between 0.1 mm to 5.0 mm, more specifically between 0.5 mm to 4.0 mm, in particular between 1.0 mm to 3.0 mm. In each case, the tolerance threshold can be half the values for the predefined movement tolerance range measured from the vector path on both sides. In embodiments, the predefined movement tolerance range can be constant for each vector point. In another embodiment, the predefined movement tolerance range can vary for at least some or all vector points. In case the writing instrument 10 is moved from the vector path towards the tolerance threshold, the haptic feedback subsystem 400 will be triggered to provide a haptic feedback to the user. The starting point indicating the user a location on an artwork medium to start an artwork operation can be selected based on the selected artwork template and/or artwork medium.

In embodiments, the route definition data can further comprise user-related parameters, artwork template related parameters and/or artwork medium related parameters. One or more of these parameters can be taken into account by defining the predefined movement tolerance range. In embodiments, the user-related parameters can include dimensions of a user's finger (e.g., finger thickness). The artwork medium related parameters can include dimensions of the artwork medium (e.g., length and width) and/or an orientation of the artwork medium. For example, a smaller artwork medium can lead to a smaller predefined movement tolerance range for a selected artwork template. The artwork template related parameters can include a resolution of features in the respective artwork, e.g., when an image is scaled from a larger size to a smaller size to fit a specific artwork medium.

The data processing unit can be further configured to run a location algorithm, which can be configured to generate location data based on the motion tracking data of the writing instrument 10. The location data can provide positioning information (including movement, orientation, position) of the writing instrument 10 based on the motion tracking data. Furthermore, the location data can comprise spatially related information regarding an artwork medium with known dimensions and orientations. In embodiments, the location data can comprise 2D data with x-y coordinates (e.g., of a flat artwork medium) or 3D data with x-y-z coordinates (e.g., of a 3D artwork medium).

The data processing unit can be configured to run a haptic feedback scheme algorithm, which can be configured to generate haptic feedback instruction data. The haptic feedback subsystem 400 can be triggered to provide a haptic feedback to a user (i.e., applying a haptic feedback on a user's hand/finger(s)/digit tips) based on the haptic feedback instruction data. More specifically, the haptic feedback subsystem 400 can be configured to emit ultrasound waves based on the haptic feedback instruction data. In particular, the first and/or second ultrasound actuator arrays 410a, 410b may be configured to emit ultrasound waves based on the haptic feedback instruction data received.

If the first data handling subsystem 200 comprises the processing unit, the first data handling subsystem 200 can be configured to generate and/or transmit the haptic feedback instruction data to the haptic feedback subsystem 400. In other words, the first data handling subsystem 200 comprising the data processing unit may not only be configured to receive and/or transmit data, but also to process data received from the sensor subsystem 300 and/or data from the second data handling subsystem 600 which in turn can be configured to receive data from the user interface subsystem 700. If the second data handling subsystem 600 comprises the processing unit, the second data handling subsystem 600 can be configured to generate and/or transmit the haptic feedback instruction data to the first data handling subsystem 200 which in turn can be configured to transmit the haptic feedback instruction data to the feedback subsystem 400. In other words, the second data handling subsystem 600 comprising the data processing unit may not only be configured to receive and/or transmit data, but also to process data received from the sensor subsystem 300 and/or from the first data handling subsystem 200 and/or from the user interface subsystem 700. If the user interface subsystem 700 comprises the processing unit, the user interface subsystem 700 can be configured to generate and/or transmit the haptic feedback instruction data to the second data handling subsystem 600 which in turn can be configured to transmit the haptic feedback instruction data to the first data handling subsystem 200, which in turn can be configured to transmit the haptic feedback instruction data to the haptic feedback subsystem 400. In other words, the user interface subsystem 700 comprising the data processing unit may not only be configured to receive and/or transmit data, but also to process data received from the sensor subsystem 300 and/or from the second data handling subsystem 600. However, it should be noted that other embodiments (e.g., with respect to external devices) may also be possible.

In embodiments, the haptic feedback instruction data can be generated based on the location data and the route definition data. More specifically, the data processing unit can be configured to process and/or compare the location data and the route definition data in order to generate the haptic feedback instruction data. The haptic feedback instruction data can comprise a timestamp indicating a timing and/or duration of a haptic feedback. The timestamp can relate to a specific timing and/or duration of providing a haptic feedback to a user, more specifically a timing of emitting ultrasound waves (initial pulses and any required follow up pulses). Furthermore, the haptic feedback instruction data can comprise trigger data indicating one or more components of the haptic feedback subsystem 400 to provide a haptic feedback. The one or more components of the haptic feedback subsystem can be the at least two ultrasound actuator arrays 410*a*, 410*b* and/or the respective ultrasound wave emitting components. The haptic feedback instruction data can comprise trigger data indicating which ultrasound actuator array and/or ultrasound emitting component should emit ultrasound waves.

In embodiments, the haptic feedback instruction data can comprise intensity data indicating the intensity of a haptic feedback. More specifically, the intensity data can indicate the intensity of the ultrasound waves emitted from the respective components. In embodiments, the haptic feedback instruction data can be based on predicted motion tracking data of the writing instrument 10, for example based on the velocity and/or acceleration with which the writing instrument is moved from the vector path towards the tolerance threshold. In embodiments, the intensity, duration, and timing of the haptic feedback can be varied, depending on the location data and the route definition data processed and/or compared for the writing instrument 10. As an example, the intensity of the haptic feedback can increase as the writing instrument 10 is moved from the vector path towards the tolerance threshold. This can lead to the writing instrument 10 being moved more smoothly over the artwork medium by a user. Furthermore, the haptic feedback instruction data can comprise artwork performing instructions for the user. More specifically, the artwork performing instructions can be generated based on the starting point provided by the route generation data and the location data, which indicate a position to start an artwork operation. The artwork performing instructions may be visualized by the user interface subsystem 700 to the user.

The writing instrument system 1 can further comprise a first power source 500, wherein the first power source 500 can be configured to supply power to the first data handling subsystem 200, the sensor subsystem 300 and/or the haptic feedback subsystem 400. Referring to FIG. 2A, the first power source 500 is arranged in the body 100 and can be a rechargeable battery. In other embodiments, the first power source 500 can be arranged as an external component with respect to the writing instrument 10 and may be connected to the writing instrument 10, more specifically to the first data handling subsystem 200, the sensor subsystem 300 and/or the haptic feedback subsystem 400, via wires.

Figure 4:
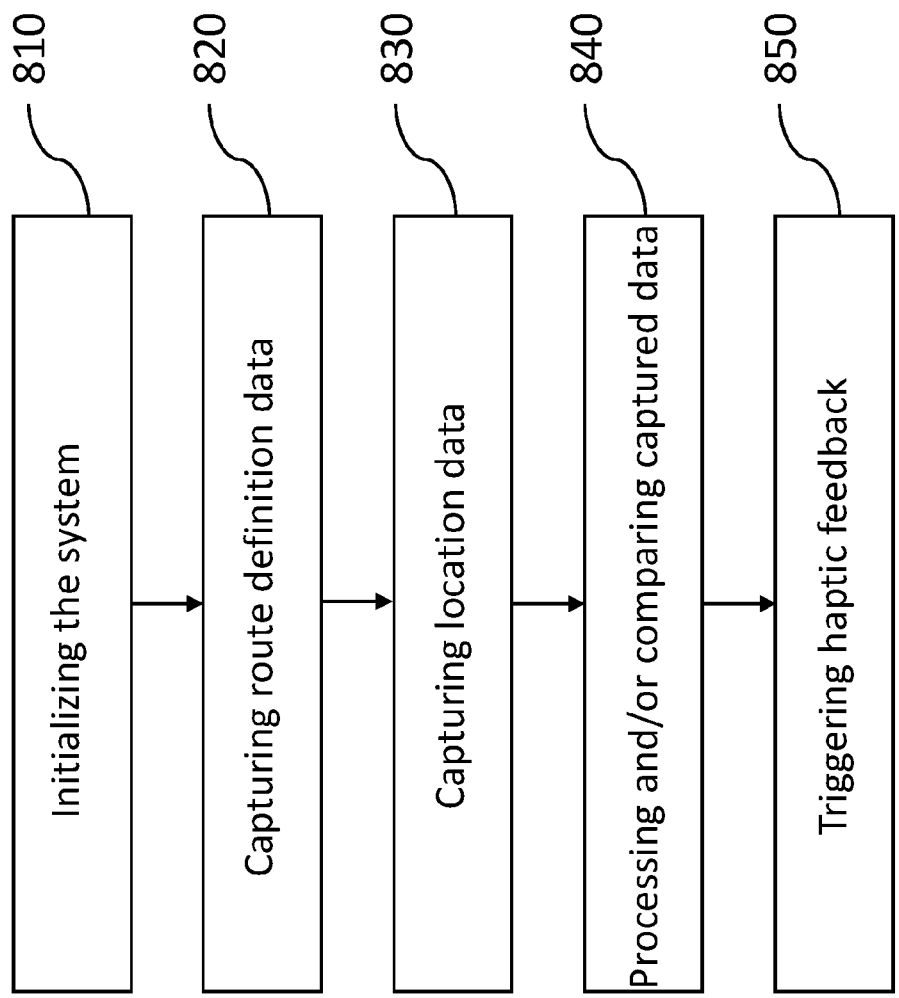
FIG. 4 is an overview of the computer-implemented method according to the third aspect of the present disclosure.
Figure 5:
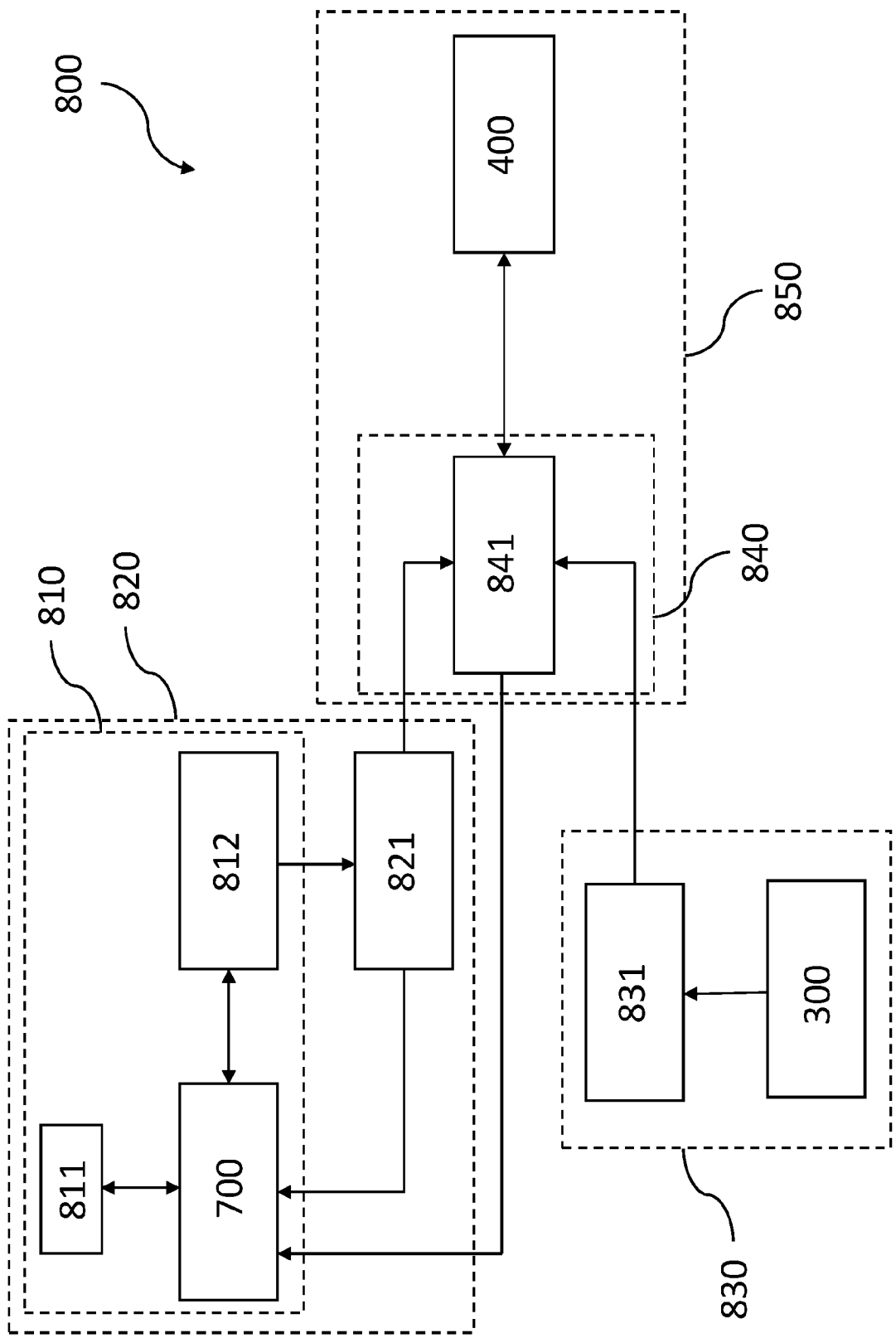
FIG. 5 is a process flow diagram of the computer-implemented method.

FIGS. 4 and 5 show an overview and a process-flow diagram of a computer-implemented method 800 for providing haptic feedback to a user U during an artwork operation using the writing instrument system 1 according to any one of the embodiments as described above. As shown in FIG. 4, the method 800 comprises the steps of initializing 810 the writing instrument system 1 to perform an artwork operation, capturing route definition data 820 from the user interface subsystem 700, capturing location data 830 from the sensor subsystem 300, processing and/or comparing 840 the captured location data and/or route definition data, and triggering 850 the haptic feedback subsystem 400 to provide a haptic feedback to a user based on the processed and/or compared captured location data and/or route definition data. As already described above, the haptic feedback may provide the sensation of "hitting a rail" to a user, helping the user to accurately perform an artwork operation. The haptic feedback may induce a momentary correction of the user's writing instrument trajectory and/or induce a sensory guidance system to "stay" on an artwork operation path (i.e., the vector path).

The described method 800 can comprise or be executable via a computer or network of computers, the computer or network of computers comprising at least one processor and at least one memory. The described procedural logic may be held in the form of executable code in at least one memory and executed by the at least one processor. The systems and subsystems may send data to the at least one processor and, in examples, they may also receive instructions from the at least one processor. The processor may thereby direct user-initiated and/or automatically generated queries to the system. The system is not limited to a particular hardware environment. Thus, distributed devices coupled via a network may perform the techniques described herein. The disclosure also includes electrical signals and computer-readable media defining instructions that, when executed by a processor, implement the techniques described herein. More specifically, the processor as described above can be or can comprise the data processing unit.

Referring to FIGS. 4 and 5, initializing 810 the writing instrument system 1 to perform an artwork operation can comprise capturing input data via the user interface subsystem 700. The input data can be in a vector format (vector graphics) or in a non-vector format. Capturing input data can comprise applying an input algorithm 812, which can be configured to prompt at least one user interaction 811 via the user interface subsystem 700, guiding a user to identify an artwork to be created and to select an artwork medium. In other words, a user U can identify an artwork to be created and an artwork medium via an interaction 811 with the user interface subsystem 700. The input algorithm can be further configured to receive an identified artwork and a selected artwork medium via the user interaction 811, more specifically wherein the input algorithm 812 can be configured to generate input data based on the user interaction 811. Thus, a user U can share the requested information (e.g., artwork to be created, selected artwork medium) via the user interface subsystem 700, which can be a digital device like a smartphone with an app interface. Based on the user input, the input algorithm 812 can generate input data.

In embodiments, the artwork medium to be selected by a user can be a sheet of paper or a digital sheet (including a capacity sensitive sensor). In other embodiments, the artwork medium can be a user's skin or any other surface that may allow an artwork to be created on.

Capturing route definition data 820 from the user interface subsystem 700 can comprise applying a route generation algorithm 821. The route generation algorithm 821 can be configured to process the input data to a vector graphics. For instance, the input data which includes data referring to the identified artwork (e.g., drawing or image) may not be in a vector format (i.e., a vector graphics). By processing the input data, a required vector graphics (e.g., svg, bmg, jpeg format) can be created. The processed input data may further comprise data referring to the dimension and nature of the artwork medium. The route generation algorithm 821 can be configured to generate an initial vector map based on the vector graphics. More specifically, the route generation algorithm 821 may be configured to generate at least one vector path based on the initial vector map, wherein the at least one vector path can comprise a plurality of vector points defining the vector path. More specifically, the vector points may define the direction of the at least one vector path. Each vector path may have properties including values for shape, curve, or thickness. In embodiments, the route generation algorithm 821 can be configured to generate a starting point by defining one or more of the plurality of vector points as one or more starting points.

Furthermore, the route generation algorithm 821 can be configured to define a predefined movement tolerance range comprising a tolerance threshold and to associate the at least one vector path, more specifically each of the plurality of vector points, with the predefined movement tolerance range. In embodiments, the route definition data can comprise one or more of the initial vector maps, the vector path comprising the plurality of vector points, the predefined movement tolerance range, and the starting point. The route definition data may further comprise user-related parameters, artwork template related parameters and/or artwork medium related parameters, more specifically wherein these parameters can be taken into account by defining the predefined movement tolerance range and/or the tolerance threshold. As described above, in embodiments, the user-related parameters can include dimensions of a user's finger (e.g., finger thickness). The artwork medium related parameters can include dimensions of the artwork medium (e.g., length and width) and/or an orientation of the artwork medium. For example, smaller dimensions of an artwork medium can lead to a smaller predefined movement tolerance range. The artwork template related parameters can include a resolution of features in the respective selected artwork, e.g., when an image is scaled from a larger size to a smaller size to fit a specific artwork medium.

As indicated in FIG. 5, subsequent to capturing route definition data 820 from the user interface subsystem 700, the method 800 may further comprise prompting an artwork operation and/or visualizing captured route definition data to a user via the user interface subsystem 700. Prompting an artwork operation and visualizing captured route definition data can comprise applying the route generation algorithm 821 to prompt at least one user interaction via the user interface subsystem 700, guiding a user to start an artwork operation on a selected artwork medium using the writing instrument 10. More specifically, prompting an artwork operation and visualizing captured route definition data can comprise applying the route generation algorithm 821 to prompt a visualization of route definition data, more specifically the starting point (or more starting points), to a user U via the user interface subsystem 700. In embodiments, the one or more starting points can be displayed to the user U by correlating the starting point with the artwork medium. Additionally or alternatively, an intensity variable haptic feedback may be provided to guide a user U to the one or more starting points on an artwork medium.

Referring to FIG. 5, capturing location data 830 from the sensor subsystem 300 can comprise capturing motion tracking data via the sensor subsystem 300 during an artwork operation of the writing instrument 10 (i.e., a user moves the writing instrument 10 on an artwork medium). The motion tracking data can comprise one or more of a position of the writing instrument 10, a direction of motion of the writing instrument 10, a speed of motion of the writing instrument 10, an acceleration of motion of the writing instrument 10, a force acting on the writing instrument 10, a mode of handling the writing instrument 10, a mode of use of the writing instrument 10 and visual data of the artwork medium. Thereby, capturing motion tracking data may comprise continuously monitoring the motion tracking data (i.e., the motion of the writing instrument 10 on the artwork medium) via the sensor subsystem 300. In embodiments, the motion tracking data can comprise a timestamp.

Capturing location data 830 from the sensor subsystem 300 can comprise defining a location of the writing instrument 10 during an artwork operation with respect to an artwork medium by applying a location algorithm 831, more specifically wherein the location algorithm 831 can be configured to generate location data by processing the motion tracking data and correlating the motion tracking data with the artwork medium. In embodiments, capturing location data 830 may comprise applying the location algorithm 831 to generate, more specifically to continuously generate, a virtual coordinate grid of the artwork medium based on the motion tracking data and to associate the virtual coordinate grid with the artwork medium. The location data can provide positioning information (including movement, orientation, position) of the writing instrument 10 with respect to the artwork medium based on the motion tracking data. The location data can comprise spatially related information regarding an artwork medium with known dimensions and orientations. In embodiments, the location data can comprise 2D data with x-y coordinates (e.g., of a flat artwork medium) or 3D data with x-y-z coordinates (e.g., of a 3D artwork medium). In embodiments, the virtual coordinate grid can be generated by processing optical data of the artwork medium, wherein the optical data may be provided by the at least one optical sensor combined with computer vision for the motion tracking of the writing instrument 10. In embodiments, capturing location data 830 can comprise applying the location algorithm 831 to correlate, more specifically to continuously correlate, tracking motion data of the writing instrument 10 with the coordinate grid associated with the artwork medium to define a position and/or orientation of the writing instrument 10 with respect to the artwork medium.

As indicated in FIG. 5, processing and/or comparing the captured route definition data and/or location data 840 can comprise applying a haptic feedback scheme algorithm 841 to process and/or compare, more specifically to continuously compare, the route definition data and the location data. Thereby, the haptic feedback scheme algorithm 841 can be configured to generate writing instrument tracking data comprising a timestamp based on the compared route definition data and location data. In other words, the writing instrument tracking data can refer to a position and/or orientation of the writing instrument 10 on the artwork medium compared to the artwork template, more specifically the vector path, generated by the route generation algorithm 821. In embodiments, the writing instrument tracking data may comprise distance data referring to a distance between writing instrument 10, more specifically the nib 110, to the defined vector path and/or individual vector points during an artwork operation, wherein the writing instrument 10 is moved over the artwork medium to create an artwork.

In embodiments, the haptic feedback scheme algorithm 841 can be configured to determine, based on the processed and/or compared route definition data and location data, whether the writing instrument 10 is operated within the predefined movement tolerance range. The haptic feedback scheme algorithm 841 can be further configured to determine whether the writing instrument 10 reaches and/or exceeds the tolerance threshold of the predefined movement tolerance range, for example based on the writing instrument tracking data as described above.

As indicated in FIG. 5, the haptic feedback scheme algorithm 841 can be configured to generate haptic feedback instruction data when determining that the writing instrument 10 reaches and/or exceeds the tolerance threshold of the predefined movement tolerance range. In an embodiment, the haptic feedback scheme algorithm 841 can be configured to generate haptic feedback instruction data based on a prediction indicative that the writing instrument 10 will reach and/or exceed the tolerance threshold. The prediction may be based on at least one basic proximity threshold defined for one or more data values of the location data and/or the route definition data. In an embodiment, the prediction can be based on the writing instrument tracking data comprising distance data and on determining whether values of the distance data increase or decrease over time with respect to the vector path and/or individual vector points.

The haptic feedback scheme algorithm 841 can be further configured to generate one or more of intensity data indicating the intensity of a haptic feedback, duration data indicating the duration of a haptic feedback, and/or timing data indicating a timing of a haptic feedback. More specifically, the intensity data, the duration data and/or the timing data can be determined by determining the position of the writing instrument 10 in the predefined movement tolerance range, more specifically by the distance of the writing instrument 10 to the tolerance threshold (e.g., by comparing the writing instrument tracking data comprising distance data with the values for predefined movement tolerance range and tolerance threshold). More detailed, intensity data can define the intensity of the ultrasound waves emitted from the respective components, the duration data can define a time length the ultrasound waves are emitted from the respective components and the timing data can define a timestamp the ultrasound waves are emitted from the respective components. In embodiments, the haptic feedback scheme algorithm 841 can be configured to increase values of intensity data and/or duration data of a haptic feedback when the writing instrument 10 is moved towards (or exceeds) the tolerance threshold. The haptic feedback instruction data may comprise one or more of intensity data, duration data and timing data of a haptic feedback. In other words, the haptic feedback instruction data may be based on location data of the writing instrument 10 compared to the route definition data, for example based on the velocity and/or acceleration with which the writing instrument 10 is moved from the vector path towards the tolerance threshold. In embodiments, the intensity, duration, and timing of a haptic feedback can be varied, depending on the location data and the route definition data. As an example, the intensity of the haptic feedback can increase as the writing instrument 10 is moved from the vector path towards the tolerance threshold. This provides for the writing instrument 10 being moved more smoothly over the artwork medium.

Referring to FIG. 5, triggering 850 the haptic feedback subsystem 400 can comprise applying the haptic feedback scheme algorithm 841 to trigger the haptic feedback subsystem 400 based on the haptic feedback instruction data. In embodiments, the haptic feedback scheme algorithm 841 can be configured to determine whether the writing instrument 10 is in physical contact with the artwork medium, and, when determining that the writing instrument 10 is physically distanced to the artwork medium, to suppress triggering haptic feedback based on the haptic feedback instruction data. In other words, "physically distanced" means that the writing instrument 10, more specifically the nib 110, is not in contact with an artwork medium. Determining whether the writing instrument 10 is in physical contact with the artwork medium can comprise applying the haptic feedback scheme algorithm 841 to process location data including proximity or contact sensor data of the writing instrument 10 with respect to the artwork medium, and/or capacitive sensor data, captured from the sensor subsystem 300. Proximity or contact sensor data may be generated by sensors (e.g., force or distance sensor), provided in the writing instrument 10, more specifically in the nib 110 of the writing instrument 10. Capacitive sensor data may be generated via the sensor subsystem 300 by capacitive sensing when the writing instrument 10 is used together with a digital artwork medium, e.g., a digital sheet. In embodiments, determining whether the writing instrument 10 is in physical contact with the artwork medium can also be carried out by processing and comparing the location data and route definition data, which can include correlation data by correlating the writing instrument 10 with the artwork medium (e.g., determining the distance of the writing instrument 10, more specifically the nib 110 with respect to the coordinate grid).

In embodiments, when triggering 840 the haptic feedback subsystem 400 to provide haptic feedback to the user, the haptic feedback scheme algorithm 841 can be applied to determine, based on the processed and/or compared location data and route definition data, if the writing instrument 10 continues exceeding or reaching the tolerance threshold, or if the writing instrument 10 returns to operate or operates within the predefined movement tolerance range. When determining that the writing instrument 10 returns to operate or operates within the predefined movement tolerance range, the haptic feedback scheme algorithm 841 can be applied to cease triggering the haptic feedback subsystem 400 to provide haptic feedback, or to lower intensity (i.e., values of intensity data) of a haptic feedback, based on the haptic feedback instruction data.

The haptic feedback scheme algorithm 841 can be further configured to prompt at least one user interaction 811 via the user interface subsystem 700 guiding a user to identify an intensity of a haptic feedback based on selecting an intensity strength value from an intensity range provided by the intensity data, and to receive an identified intensity and selected intensity strength value. Based on the chosen intensity strength value, a user U can decide the strength of an intensity of a haptic feedback when performing an artwork operation. This may allow the user U to determine to what extent and how much help a user U would like to receive from the system 1.

1. A writing instrument (10), comprising:
    a body (100);
    a first data handling subsystem (200) arranged in the body (100) and configured to transmit and/or receive data; and
    a haptic feedback subsystem (400) arranged in the body (100) and configured to receive data from the first data handling subsystem (200), wherein the haptic feedback subsystem (400) is configured to provide a haptic feedback to a user (U) based on data received from the first data handling subsystem (200).

2. The writing instrument (10) according to embodiment 1, wherein the haptic feedback subsystem (400) is an ultrasound actuator.

3. The writing instrument (10) according to embodiment 1 or embodiment 2, wherein the writing instrument (10) comprises a longitudinal axis (X) and a radial direction (R) perpendicular to the longitudinal axis (X).

4. The writing instrument (10) according to embodiment 3, wherein the haptic feedback subsystem (400) is configured to emit ultrasound waves in the radial direction (R), more specifically wherein the ultrasound waves are targeted to a focus point (P).

5. The writing instrument (10) according to any one of the preceding embodiments, wherein the haptic feedback subsystem (400) comprises at least two ultrasound actuator arrays (410a, 410b).

6. The writing instrument (10) according to embodiment 5, when dependent on embodiment 3, wherein the at least two ultrasound actuator arrays (410a, 410b) are separated by an angle (a) measured in a circumferential direction of the body (100) with respect to the longitudinal axis (X), more specifically wherein each of the at least two ultrasound actuator arrays (410a, 410b) is oriented towards the radial direction (R).

7. The writing instrument (10) according to embodiment 6, wherein the angle (a) is about 60° to 180°, more specifically about 90° to 150°.

8. The writing instrument (10) according to any one of embodiments 5 to 7, wherein each of the at least two ultrasound actuator arrays (410a, 410b) comprises a plurality of ultrasound wave emitting components.

9. The writing instrument (10) according to embodiment 8, wherein the plurality of ultrasound wave emitting components are arranged in a linear configuration, more specifically wherein the plurality of ultrasound wave emitting components are arranged adjacent and aligned to each other in the direction of the longitudinal axis (X).

10. The writing instrument (10) according to embodiment 8 or embodiment 9, wherein, in the radial direction (R), the plurality of ultrasound wave emitting components are arranged on a circular path (r1) facing away from the longitudinal axis (X).

11. The writing instrument (10) according to any one of the preceding embodiments, further comprising a nib (110) connected to a first end (101) of the body (100), and wherein the body (100) comprises a grip (120) which is arranged proximate the nib (110).

12. The writing instrument (10) according to embodiment 11, wherein the haptic feedback subsystem (400) is arranged in the grip (120).

13. The writing instrument (10) according to embodiment 11 or embodiment 12, wherein the haptic feedback subsystem (400) is arranged proximate the first end (101) and/or wherein the first data handling subsystem (200) is arranged proximate a second end (102) of the body (100).

14. A writing instrument system (1) for providing a haptic feedback to a user, comprising:
 a writing instrument (10) according to any one of the preceding embodiments;
 a second data handling subsystem (600) configured to receive and/or transmit data to the first data handling subsystem (200); and
 a user interface subsystem (700) configured to generate input data based on a user's input and configured to transmit the input data to the second data handling subsystem (600).

15. The writing instrument system (1) according to embodiment 14, further comprising a sensor subsystem (300), wherein the sensor subsystem (300) is configured to generate and transmit data to the first data handling subsystem (200) and/or to the second data handling subsystem (600), more specifically wherein the sensor subsystem (300) is configured to generate and transmit motion tracking data of the writing instrument (10).

16. The writing instrument system (1) according to embodiment 15, wherein the sensor subsystem (300) is arranged in the body (100) and/or integrated in an external device.

17. The writing instrument system (1) according to embodiment 16, wherein the external device is a part of the user interface subsystem (700).

18. The writing instrument system (1) according to any one of embodiments 15 to 17, wherein the sensor subsystem (300) comprises one or more sensors configured to generate motion tracking data of the writing instrument (10).

19. The writing instrument system (1) according to embodiment 18, wherein the one or more sensors include an accelerometer.

20. The writing instrument system (1) according to embodiment 18 or embodiment 19, wherein the one or more sensors include at least one rotational sensor.

21. The writing instrument system (1) according to any one of embodiments 18 to 20, wherein the one or more sensors include at least one optical sensor.

22. The writing instrument system (1) according to any one of embodiments 14 to 21, wherein the second data handling subsystem (600) is a part of the user interface subsystem (700).

23. The writing instrument system (1) according to any one of embodiments 14 to 22, wherein the first data handling subsystem (200) and/or the second data handling subsystem (600) and/or the user interface subsystem (700) comprises a data processing unit configured to process data.

24. The writing instrument system (1) according to embodiment 23, wherein the data processing unit is configured to process the input data generated by the user interface subsystem (700).

25. The writing instrument system (1) according to embodiment 24, wherein the user interface subsystem (700) comprises a displaying unit that is configured to provide a visual feedback to a user based on visual data, more specifically wherein the visual data is generated by the processed input data.

26. The writing instrument system (1) according to any one of embodiments 23 to 25, wherein the processing unit is configured to run a route generation algorithm, which is configured to generate route definition data based on the user input data.

27. The writing instrument system (1) according to embodiment 26, wherein the route definition data comprises one or more of an initial vector map, at least one vector path comprising a plurality of vector points, a predefined movement tolerance range, and a starting point.

28. The writing instrument system (1) according to any one of embodiments 23 to 27 and embodiment 15, wherein the data processing unit is configured to run a location algorithm, which is configured to generate location data based on the motion tracking data of the writing instrument (10).

29. The writing instrument system (1) according to any one of embodiments 23 to 28, wherein the data processing unit is configured to run a haptic feedback scheme algorithm, which is configured to generate haptic feedback instruction data, more specifically wherein the haptic feedback subsystem (400) is triggered to provide a haptic feedback based on the haptic feedback instruction data.

30. The writing instrument system (1) according to embodiment 29, wherein the haptic feedback subsystem (400) is configured to emit ultrasound waves based on the haptic feedback instruction data.

31. The writing instrument system (1) according to embodiment 29 or embodiment 30, wherein the haptic feedback instruction data is generated based on the location data and the route definition data.

32. The writing instrument system (1) according to any one of embodiments 29 to 31, wherein the haptic feedback instruction data comprises a timestamp indicating a timing and/or duration of a haptic feedback.

33. The writing instrument system (1) according to any one of embodiments 29 to 32, wherein the haptic feedback instruction data comprises trigger data indicating one or more components of the haptic feedback subsystem (400) to provide a haptic feedback.

34. The writing instrument system (1) according to any one of embodiments 29 to 33, wherein the haptic feedback instruction data comprises intensity data indicating the intensity of the haptic feedback.

35. The writing instrument system (1) according to any one of embodiments 15 to 34, further comprising a first power source (500), wherein the first power source (500) is configured to supply power to the first data handling subsystem (200), the sensor subsystem (300) and/or the haptic feedback subsystem (400).

36. The writing instrument (10) according to embodiment 35, wherein the first power source (500) is arranged in the body (100).

37. A computer-implemented method (800) for providing haptic feedback to a user (U) during an artwork operation using a writing instrument system (1) according to any one of embodiments 14 to 36, comprising the steps of:
   initializing (810) the writing instrument system (1) to perform an artwork operation;
   capturing route definition data (820) from the user interface subsystem (700);
   capturing location data (830) from the sensor subsystem (300);
   processing and/or comparing (840) the captured location data and/or route definition data; and
   triggering (850) the haptic feedback subsystem (400) to provide a haptic feedback to a user based on the processed and/or compared captured location data and/or route definition data.

38. The method (800) according to embodiment 37, wherein initializing (810) the writing instrument system (1) to perform an artwork operation comprises capturing input data via the user interface subsystem (700).

39. The method (800) according to embodiment 38, wherein capturing input data comprises applying an input algorithm (812).

40. The method (800) according to embodiment 39, wherein the input algorithm (812) is configured to prompt at least one user interaction (811) via the user interface subsystem (700) guiding a user to identify an artwork to be created and to select an artwork medium, and to receive an identified artwork and a selected artwork medium via the user interaction (811), more specifically wherein the input algorithm (812) is configured to generate input data based on the user interaction (811).

41. The method (800) according to embodiment 40, wherein the artwork medium is a sheet of paper or a digital sheet.

42. The method (800) according to any one of embodiments 37 to 41, wherein capturing route definition data (820) from the user interface subsystem (700) comprises applying a route generation algorithm (821).

43. The method (800) according to embodiment 42, wherein the route generation algorithm (821) is configured to process the input data to a vector graphics.

44. The method (800) according to embodiment 43, wherein the route generation algorithm (821) is configured to generate an initial vector map based on the vector graphics.

45. The method (800) according to embodiment 44, wherein the route generation algorithm (821) is configured to generate at least one vector path based on the initial vector map, more specifically wherein the at least one vector path comprises a plurality of vector points.

46. The method (800) according to embodiment 45, wherein the route generation algorithm (821) is configured to generate a starting point by defining one of the plurality of vector points as a starting point.

47. The method (800) according to embodiment 45 or embodiment 46, wherein the route generation algorithm (821) is configured to define a predefined movement tolerance range comprising a tolerance threshold and to associate the at least one vector path, more specifically each of the plurality of vector points, with the predefined movement tolerance range.

48. The method (800) according to embodiment 47, wherein the route definition data comprise one or more of the initial vector map, the vector path comprising a plurality of vector points, the predefined movement tolerance range, and the starting point.

49. The method (800) according to any one of embodiments 37 to 48, wherein, subsequent to capturing route definition data (820) from the user interface subsystem (700), further comprising prompting an artwork operation and/or visualizing captured route definition data to a user via the user interface subsystem (700).

50. The method (800) according to embodiment 49, when dependent on embodiment 42, wherein prompting an artwork operation and visualizing captured route definition data comprises applying the route generation algorithm (821) to prompt at least one user interaction via the user interface subsystem (700) guiding a user to start an artwork operation on a selected artwork medium using the writing instrument (10).

51. The method (800) according to embodiment 50, wherein prompting an artwork operation and visualizing captured route definition data comprises applying the route generation algorithm (821) to prompt a visualization of route definition data, more specifically the starting point, to a user via the user interface subsystem (700).

52. The method (800) according to any one of embodiments 37 to 50, wherein capturing location data (830) from the sensor subsystem (300) comprises capturing motion tracking data via the sensor subsystem (300) during an artwork operation of the writing instrument (10).

53. The method (800) according to embodiment 52, wherein the motion tracking data comprises one or more of a position of the writing instrument (10), a direction of motion of the writing instrument (10), a speed of motion of the writing instrument (10), an acceleration of motion of the writing instrument (10), a force acting on the writing instrument (10), a mode of handling the writing instrument (10), a mode of use of the writing instrument (10) and visual data of the artwork medium.

54. The method (800) according to embodiment 52 or embodiment 53, wherein capturing motion tracking data comprises continuously monitoring the motion tracking data via the sensor subsystem (300).

55. The method (800) according to any one of embodiments 52 to 54, wherein the motion tracking data comprises a timestamp.

56. The method (800) according to any one of embodiments 37 to 55, wherein capturing location data (830) from the sensor subsystem (300) comprises defining a location of the writing instrument (10) during an artwork operation with respect to an artwork medium by applying a location algorithm (831), more specifically wherein the location algorithm (831) is configured to generate location data by processing the motion tracking data and correlating the motion tracking data with the artwork medium.

57. The method (800) according to embodiment 56, wherein capturing location data (830) comprises applying the location algorithm (831) to generate, more specifically to continuously generate, a virtual coordinate grid of the artwork medium based on the motion tracking data and to associate the virtual coordinate grid with the artwork medium.

58. The method (800) according to embodiment 57, wherein capturing location data (830) comprises applying the location algorithm (831) to correlate, more specifically to continuously correlate, tracking motion data of the writing instrument (10) with the coordinate grid associated with the artwork medium to define a position and/or orientation of the writing instrument (10) with respect to the artwork medium.

59. The method (800) according to any one of embodiments 37 to 58, wherein processing and/or comparing the captured route definition data and/or location data (840) comprises applying a haptic feedback scheme algorithm (841) to process and/or compare, more specifically to continuously compare, the route definition data and the location data.

60. The method (800) according to embodiment 59, wherein the haptic feedback scheme algorithm (841) is configured to generate writing instrument tracking data comprising a timestamp based on the compared route definition data and location data.

61. The method (800) according to embodiment 59 or embodiment 60, when dependent on embodiment 47, wherein the haptic feedback scheme algorithm (841) is configured to determine, based on the processed and/or compared route definition data and location data, whether the writing instrument (10) is operated within the predefined movement tolerance range, and wherein the haptic feedback scheme algorithm (841) is configured to determine whether the writing instrument (10) reaches and/or exceeds the tolerance threshold of the predefined movement tolerance range.

62. The method (800) according to embodiment 61, wherein the haptic feedback scheme algorithm (841) is configured to generate haptic feedback instruction data when determining that the writing instrument (10) reaches and/or exceeds the tolerance threshold of the predefined movement tolerance range.

63. The method (800) according to embodiment 62, wherein the haptic feedback scheme algorithm (841) is configured to generate haptic feedback instruction data based on a prediction indicative that the writing instrument (10) will reach the tolerance threshold.

64. The method (800) according to embodiment 63, wherein the prediction is based on at least one basic proximity threshold defined for one or more data values of the location data and/or the route definition data.

65. The method (800) according to any one of embodiments 59 to 64, when dependent on embodiment 47, wherein the haptic feedback scheme algorithm (841) is configured to generate one or more of intensity data indicating the intensity of a haptic feedback, duration data indicating the duration of a haptic feedback, and/or timing data indicating a timing of a haptic feedback, more specifically wherein the intensity data, the duration data and/or the timing data are determined by determining the position of the writing instrument (10) in the predefined movement tolerance range, more specifically by the distance of the writing instrument (10) to the tolerance threshold.

66. The method (800) according to embodiment 65, wherein the haptic feedback scheme algorithm (841) is configured to increase values of intensity data and/or duration data of a haptic feedback when the writing instrument (10) is moved towards the tolerance threshold.

67. The writing instrument system (1) according to embodiment 65 or embodiment 66, wherein the haptic feedback instruction data comprises one or more of intensity data, duration data and timing data of a haptic feedback.

68. The method (800) according to any one of embodiments 63 to 67, wherein triggering (850) the haptic feedback subsystem (400) comprises applying the haptic feedback scheme algorithm (841) to trigger the haptic feedback subsystem (400) based on the haptic feedback instruction data.

69. The method (800) according to embodiment 68, wherein the haptic feedback scheme algorithm (841) is configured to determine whether the writing instrument (10) is in physical contact with the artwork medium, and, when determining that the writing instrument (10) is physically distanced to the artwork medium, to suppress triggering haptic feedback based on the haptic feedback instruction data.

70. The method (800) according to embodiment 69, wherein determining whether the writing instrument (10) is in physical contact with the artwork medium comprises applying the haptic feedback scheme algorithm (841) to process location data including proximity or contact sensor data of the writing instrument (10) with respect to the artwork medium, or capacitive sensor data, captured from the sensor subsystem (300).

71. The method (800) according to any one of embodiments 68 to 70, wherein, when triggering (840) the haptic feedback subsystem (400) to provide haptic feedback to the user, applying the haptic feedback scheme algorithm (841) to determine, based on the processed and/or compared location data and route definition data, if the writing instrument (10) continues exceeding or reaching the tolerance threshold, or, if the writing instrument (10) returns to operate or operates within the predefined movement tolerance range.

72. The method (800) according to embodiment 71, wherein, when determining that the writing instrument (10) returns to operate or operates within the predefined movement tolerance range, applying the feedback scheme algorithm (841) to cease triggering the haptic feedback subsystem (400) to provide haptic feedback based on the haptic feedback instruction data.

73. The method (800) according to any one of embodiments 65 to 72, wherein the haptic feedback scheme algorithm (841) is configured to prompt at least one user interaction (811) via the user interface subsystem (700) guiding a user to identify an intensity of a haptic feedback based on selecting an intensity strength value from an intensity range provided by the intensity data, and to receive an identified intensity and selected intensity strength value.

| REFERENCE NUMERALS | |
|---|---|
| X | longitudinal axis of the writing instrument |
| R | radial direction of the writing instrument |
| U | user |
| P | focus point |
| α | angle between ultrasound actuator arrays |
| r1 | circular path |
| 1 | writing instrument system |
| 10 | writing instrument |
| 100 | body |
| 101 | first end of the body |
| 102 | second end of the body |
| 110 | nib |
| 120 | grip |

-continued

| REFERENCE NUMERALS | |
|---|---|
| 130 | outer circumferential surface of the body |
| 200 | first data handling subsystem |
| 300 | sensor subsystem |
| 400 | haptic feedback subsystem |
| 410a | ultrasound actuator array |
| 410b | ultrasound actuator array |
| 600 | second data handling subsystem |
| 700 | user interface subsystem |
| 800 | computer-implemented method |
| 810 | initializing writing instrument |
| 811 | user interaction |
| 812 | input algorithm |
| 820 | capturing route definition data |
| 821 | route generation algorithm |
| 830 | capturing location data |
| 831 | location algorithm |
| 840 | capturing and/or processing of captured location and/or route definition data |
| 841 | haptic feedback scheme algorithm |
| 850 | triggering the haptic feedback subsystem |

The invention claimed is:

1. A writing instrument, comprising:
a body;
a first data handling subsystem arranged in the body and configured to receive and transmit data, wherein the first data handling subsystem includes a data processing unit for processing the received data to generate haptic feedback instruction for transmission, and wherein the haptic feedback instruction is generated based on location data and route definition data associated with the writing instrument;
a second data handling subsystem configured to process input data from a user interface subsystem and motion tracking data generated by a sensor subsystem, wherein the second data handling subsystem transmits the input data and motion tracking data to the first data handling subsystem;
a haptic feedback subsystem arranged in the body and configured to receive the haptic feedback instruction transmitted by the first data handling subsystem, wherein the haptic feedback subsystem is configured to provide an adjustable haptic feedback to a user, and wherein the adjustable haptic feedback includes variability in intensity, duration, and timing of the feedback based on the location data and the route definition data;
the haptic feedback subsystem includes one or more ultrasound actuator arrays separated by an angle measured in a circumferential direction of the body with respect to a longitudinal axis and oriented towards a radial direction, wherein each of the one or more ultrasound actuator arrays include a plurality of ultrasound wave emitting components arranged on a circular path facing away from the longitudinal axis for emitting ultrasound waves; and
the user interface subsystem configured to generate visual feedback, wherein the visual feedback is synchronized with the haptic feedback.

2. The writing instrument according to claim 1, wherein the haptic feedback subsystem is configured to emit the ultrasound waves in the radial direction.

3. The writing instrument according to claim 1, further comprising a nib connected to a first end of the body, and wherein the nib is configured to be releasably connected to the body to enable fluid communication with a fluid reservoir.

4. The writing instrument according to claim 3, wherein the haptic feedback subsystem is arranged in a grip positioned proximate to the nib and on an outer circumferential surface of the body.

5. The writing instrument according to claim 1, further comprising:
the user interface subsystem configured to generate the input data based on a user's input and configured to transmit the input data to the second data handling subsystem.

6. The writing instrument according to claim 5, wherein the data processing unit is configured to run a haptic feedback scheme algorithm, which is configured to generate haptic feedback instruction data, wherein the haptic feedback subsystem is triggered to provide the haptic feedback based on the haptic feedback instruction data.

7. The writing instrument according to claim 6, wherein the haptic feedback subsystem is configured to emit the ultrasound waves based on the haptic feedback instruction data.

8. The writing instrument according to claim 5, wherein the data processing unit is configured to run a route generation algorithm, which is configured to generate the route definition data based on user input data.

9. The writing instrument according to claim 8, wherein a haptic feedback instruction data is generated based on the location data and the route definition data.

10. The writing instrument according to claim 1, further comprising:
the sensor subsystem arranged in the body and configured to generate and transmit data to the first data handling subsystem and/or to the second data handling subsystem, wherein the sensor subsystem includes:
one or more motion sensors for capturing the motion tracking data of the writing instrument, wherein the motion tracking data includes one or more of: a position of the writing instrument, a direction of motion of the writing instrument, a speed of motion of the writing instrument, an acceleration of motion of the writing instrument, a force acting on the writing instrument, a mode of handling the writing instrument, or a mode of use of the writing instrument; and
a communication unit for transmitting the motion tracking data to the first data handling subsystem and/or to the second data handling subsystem.

11. The writing instrument according to claim 10, wherein the sensor subsystem is arranged in the body and/or integrated in an external device.

12. The writing instrument according to claim 1, wherein the second data handling subsystem is a part of the user interface subsystem.

13. A computer-implemented method for providing a haptic feedback to a user during an artwork operation using a writing instrument, comprising:
initializing the writing instrument to perform the artwork operation;
capturing route definition data from a user interface subsystem;
capturing location data from a sensor subsystem;
processing and comparing the location data and the route definition data by applying a haptic feedback scheme algorithm, wherein the haptic feedback scheme algorithm generates writing instrument tracking data including a timestamp and determines whether the writing instrument is operated within a tolerance threshold;

triggering a haptic feedback subsystem to provide the haptic feedback to the user based on a prediction that the writing instrument reaches the tolerance threshold;

increasing values of intensity data and/or duration data of the haptic feedback based on determining the writing instrument is moving towards the tolerance threshold; and generating, utilizing the haptic feedback scheme algorithm, a visual feedback via the user interface subsystem, wherein the visual feedback guides the user to identify the intensity of the haptic feedback by selecting an intensity strength value from an intensity range provided by intensity data.

14. The computer-implemented method according to claim 13, wherein initializing the writing instrument to perform the artwork operation comprises capturing input data via the user interface subsystem.

15. The computer-implemented method according to claim 14, wherein capturing the input data comprises applying an input algorithm.

16. The computer-implemented method according to claim 15, wherein the input algorithm is configured to prompt at least one user interaction via the user interface subsystem guiding the user to identify an artwork to be created and to select an artwork medium, and to receive an identified artwork and a selected artwork medium via the user interaction, wherein the input algorithm is configured to generate the input data based on the user interaction.

17. The computer-implemented method according to claim 14, wherein capturing the route definition data from the user interface subsystem comprises applying a route generation algorithm, wherein the route generation algorithm is configured to process the input data to a vector graphics, and wherein the route generation algorithm is configured to generate an initial vector map based on the vector graphics.

18. The computer-implemented method according to claim 17, wherein the route generation algorithm is configured to generate at least one vector path based on the initial vector map, wherein the at least one vector path comprises a plurality of vector points.

19. The computer-implemented method according to claim 18, wherein the route generation algorithm is configured to define a predefined movement tolerance range comprising a tolerance threshold and to associate the at least one vector path with the predefined movement tolerance range.

20. The computer-implemented method according to claim 13, wherein the haptic feedback scheme algorithm determines whether the writing instrument is in physical contact with an artwork medium, and wherein the haptic feedback scheme algorithm suppresses triggering the haptic feedback upon determining the writing instrument is physically distanced from the artwork medium.

* * * * *